US009998760B2

(12) United States Patent
Chen et al.

(10) Patent No.: US 9,998,760 B2
(45) Date of Patent: Jun. 12, 2018

(54) METHOD AND APPARATUS OF CONSTRAINED DISPARITY VECTOR DERIVATION IN 3D VIDEO CODING

(71) Applicant: HFI Innovation Inc., Zhubei, Hsinchu County (TW)

(72) Inventors: Yi-Wen Chen, Taichung (TW); Jian-Liang Lin, Su'ao Township, Yilan County (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 403 days.

(21) Appl. No.: 14/442,937

(22) PCT Filed: Nov. 15, 2013

(86) PCT No.: PCT/CN2013/087215
§ 371 (c)(1),
(2) Date: May 14, 2015

(87) PCT Pub. No.: WO2014/075625
PCT Pub. Date: May 22, 2014

(65) Prior Publication Data
US 2015/0288985 A1   Oct. 8, 2015

Related U.S. Application Data

(60) Provisional application No. 61/756,043, filed on Jan. 24, 2013, provisional application No. 61/727,220, filed on Nov. 16, 2012.

(51) Int. Cl.
*H04N 19/597* (2014.01)
*H04N 19/176* (2014.01)
(Continued)

(52) U.S. Cl.
CPC ....... *H04N 19/597* (2014.11); *H04N 13/0048* (2013.01); *H04N 19/176* (2014.11); *H04N 19/52* (2014.11)

(58) Field of Classification Search
CPC .... H04N 19/176; H04N 19/52; H04N 19/595; H04N 13/0048; H04N 19/597
(Continued)

(56) References Cited

U.S. PATENT DOCUMENTS 9,615,090 B2 * 4/2017 Zhang ................. H04N 19/597
2008/0170618 A1   7/2008 Choi et al.
(Continued)

FOREIGN PATENT DOCUMENTS

CN   101601304   12/2009
CN   102244801   11/2011
(Continued)

OTHER PUBLICATIONS

Y-L Chang et al: "3D-CE5.h related: Depth-oriented Neighboring Block Disparity Vector (DoNBDV) with virtual depth", 2. JCT-3V Meeting; 102. MPEG Meeting; Oct. 13, 2012-Oct. 19, 2012; Shanghai; (The Joint Collaborative Team on 3D Video Coding Extension Development of ISO/IEC JTC1/SC29/WG11 and ITU-T SG.16 ).*
(Continued)

*Primary Examiner* — William C Vaughn, Jr.
*Assistant Examiner* — Jae N Noh
(74) *Attorney, Agent, or Firm* — Oblon, McClelland, Maier & Neustadt, L.L.P.

(57) ABSTRACT

A method and apparatus for three-dimensional video encoding or decoding with conditionally constrained disparity vector are disclosed. In one embodiment, a derived DV (disparity vector) for the current texture block is determined and DV constraint is applied or is not applied to the derived
(Continued)

DV to obtain a final derived DV. Inter-view predictive encoding or decoding is then applied to the input data utilizing at least one of selected coding tools, wherein a same final derived DV is used by all selected coding tools, and the selected coding tools comprise inter-view residual prediction, view synthesis prediction and inter-view motion parameter prediction.

21 Claims, 8 Drawing Sheets

(51) Int. Cl.
 *H04N 19/52* (2014.01)
 *H04N 13/00* (2018.01)
(58) Field of Classification Search
 USPC .................................................. 375/240.26
 See application file for complete search history.

(56) References Cited

U.S. PATENT DOCUMENTS

| | | | | |
|---|---|---|---|---|
| 2013/0176389 A1* | 7/2013 | Chen | .................... | H04N 19/597 348/43 |
| 2014/0071235 A1* | 3/2014 | Zhang | .................. | H04N 19/597 348/43 |
| 2014/0098883 A1* | 4/2014 | Hannuksela | ......... | H04N 19/597 375/240.16 |

FOREIGN PATENT DOCUMENTS

| | | | | |
|---|---|---|---|---|
| CN | | 102291579 | 12/2011 | |
| WO | WO 2014089475 A1 * | | 6/2014 | ........... H04N 19/597 |

OTHER PUBLICATIONS

Schwarz, H., et al.; "Description of 3D Video Coding Technology Proposal by Fraunhofer HHI (HEVC compatible; configuration B);" International Organisation for Standardisation; Nov. 2011; pp. 1-46.

Zhang, K., et al.; "3D-CE5.h related Improvement on MV candidates for 3DVC;" Joint Collaborative Team on 3D Video Coding Extension Development of ITU-T SG 16 WP 3 and ISO/IEC JTC 1/SC 29/WG 11; Oct. 2012; pp. 1-12.

Schwarz, H., et al.; "Inter-view prediction of motion data in multiview video coding;" Picture Coding Symposium; May 2012; pp. 101-104.

Chang, Y.L., et al.; "3D-CE5.h related Depth-oriented Neighboring Block Disparity Vector (DoNBVD) with Virtual Depth Retrieval;" Joint Collaborative Team on 3D Video Coding Extension Development of ITU-T SG 16 WP 3 and ISO/IEC JTC 1/SC 29/WG 11; Oct. 2012; pp. 1-6.

Lin, J.L., et al.; "3D-CE5. a related Simplification on the disparity vector derivation for AVC-based 3D video coding;" Joint Collaborative Team on 3D Video Coding Extension Development of ITU-T SG 16 WP 3 and ISO/IEC JTC 1/SC 29/WG 11; Jul. 2012; pp. 1-4.

Chen, Y.W., et al.; "3D-CE5.h related Constrained DV for inter-view data access;" Joint Collaborative Team on 3D Video Coding Extension Development of ITU-T SG 16 WP 3 and ISO/IEC JTC 1/SC 29/WG 11; Oct. 2012; pp. 1-4.

Su, W.; "3DV-CE1.a Block-based view synthesis Prediction for 3DV-ATM;" Joint Collaborative Team on 3D Video coding Extension Development of ITU-T SG 16 WP 3 and ISO/IEC JTC 1/SC 29/WG 11; Jul. 2012; pp. 1-6.

Uchiumi, T., et al.; "3D-CE5.h related Restricted motion vector coding for inter-view prediction;" Joint Collaborative Team on 3D Video Coding Extension Development of ITU-T SG 16 WP 3 and ISO/IEC JTC 1/SC 29/WG 11; Oct. 2012; pp. 1-5.

International Search Report dated Feb. 20, 2014, issued in PCT/CN2013/087215.

* cited by examiner

METHOD AND APPARATUS OF CONSTRAINED DISPARITY VECTOR DERIVATION IN 3D VIDEO CODING

CROSS REFERENCE TO RELATED APPLICATIONS

The present invention is a National Stage Application of PCT Application Ser. No. PCT/CN2013/087215, filed on Nov. 15, 2013, which claims priority to U.S. Provisional Patent Application, Ser. No. 61/727,220, filed on Nov. 16, 2012, entitled "Controlling of disparity vector constraint for video coding" and U.S. Provisional Patent Application, Ser. No. 61/756,043, filed on Jan. 24, 2013, entitled "Inter-view signal prediction conditional on disparity vector constraints for video". The priority applications are hereby incorporated by reference in their entireties.

TECHNICAL FIELD

The present invention relates to three-dimensional video coding. In particular, the present invention relates to disparity vector derivation for inter-view residual prediction and inter-view motion parameter prediction in 3D video coding.

BACKGROUND

Three-dimensional (3D) television has been a technology trend in recent years that intends to bring viewers sensational viewing experience. Various technologies have been developed to enable 3D viewing. Among them, the multi-view video is a key technology for 3DTV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism.

The multi-view video is typically created by capturing a scene using multiple cameras simultaneously, where the multiple cameras are properly located so that each camera captures the scene from one viewpoint. Accordingly, the multiple cameras will capture multiple video sequences corresponding to multiple views. In order to provide more views, more cameras have been used to generate multi-view video with a large number of video sequences associated with the views. Accordingly, the multi-view video will require a large storage space to store and/or a high bandwidth to transmit. Therefore, multi-view video coding techniques have been developed in the field to reduce the required storage space or the transmission bandwidth.

A straightforward approach may be to simply apply conventional video coding techniques to each single-view video sequence independently and disregard any correlation among different views. Such coding system would be very inefficient. In order to improve efficiency of multi-view video coding, typical multi-view video coding exploits inter-view redundancy. Therefore, most 3D Video Coding (3DVC) systems take into account of the correlation of video data associated with multiple views and depth maps. The standard development body, the Joint Video Team of the ITU-T Video Coding Experts Group (VCEG) and the ISO/IEC Moving Picture Experts Group (MPEG), extended H.264/MPEG-4 AVC to multi-view video coding (MVC) for stereo and multi-view videos.

The MVC adopts both temporal and spatial predictions to improve compression efficiency. During the development of MVC, some macroblock-level coding tools are proposed, including illumination compensation, adaptive reference filtering, motion skip mode, and view synthesis prediction. These coding tools are proposed to exploit the redundancy between multiple views. Illumination compensation is intended for compensating the illumination variations between different views. Adaptive reference filtering is intended to reduce the variations due to focus mismatch among the cameras. Motion skip mode allows the motion vectors in the current view to be inferred from the other views. View synthesis prediction is applied to predict a picture of the current view from other views.

In the reference software for HEVC based 3D video coding (3D-HTM), inter-view candidate is added as a motion vector (MV) or disparity vector (DV) candidate for Inter, Merge and Skip mode in order to re-use previously coded motion information of adjacent views. In 3D-HTM, the basic unit for compression, termed as coding unit (CU), is a 2N×2N square block. Each CU can be recursively split into four smaller CUs until a predefined minimum size is reached. Each CU contains one or more prediction units (PUs).

To share the previously coded texture information of adjacent views, a technique known as Disparity-Compensated Prediction (DCP) has been included in 3D-HTM as an alternative coding tool to motion-compensated prediction (MCP). MCP refers to an inter-picture prediction that uses previously coded pictures of the same view, while DCP refers to an inter-picture prediction that uses previously coded pictures of other views in the same access unit. FIG. 1 illustrates an example of 3D video coding system incorporating MCP and DCP. The vector (110) used for DCP is termed as disparity vector (DV), which is analog to the motion vector (MV) used in MCP. FIG. 1 illustrates three MVs (120, 130 and 140) associated with MCP. Moreover, the DV of a DCP block can also be predicted by the disparity vector predictor (DVP) candidate derived from neighboring blocks or the temporal collocated blocks that also use inter-view reference pictures. In 3D-HTM, when deriving an inter-view Merge candidate for Merge/Skip modes, if the motion information of corresponding block is not available or not valid, the inter-view Merge candidate is replaced by a DV.

Inter-view residual prediction is another coding tool used in 3D-HTM. To share the previously coded residual information of adjacent views, the residual signal of the current prediction block (PU) can be predicted by the residual signals of the corresponding blocks in the inter-view pictures as shown in FIG. 2. The corresponding blocks can be located by respective DVs. The video pictures and depth maps corresponding to a particular camera position are indicated by a view identifier (i.e., V0, V1 and V2 in FIG. 2). All video pictures and depth maps that belong to the same camera position are associated with the same viewId (i.e., view identifier). The view identifiers are used for specifying the coding order within the access units and detecting missing views in error-prone environments. An access unit includes all video pictures and depth maps corresponding to the same time instant. Inside an access unit, the video picture and, when present, the associated depth map having viewId equal to 0 are coded first, followed by the video picture and depth map having viewId equal to 1, etc. The view with viewId equal to 0 (i.e., V0 in FIG. 2) is also referred to as the base view or the independent view. The base view video pictures can be coded using a conventional HEVC video coder without dependence on other views.

As can be seen in FIG. 2, for the current block, motion vector predictor (MVP)/disparity vector predictor (DVP)

can be derived from the inter-view blocks in the inter-view pictures. In the following, inter-view blocks in inter-view picture may be abbreviated as inter-view blocks. The derived candidate is termed as inter-view candidates, which can be inter-view MVPs or DVPs. The coding tools that codes the motion information of a current block (e.g., a current prediction unit, PU) based on previously coded motion information in other views is termed as inter-view motion parameter prediction. Furthermore, a corresponding block in a neighboring view is termed as an inter-view block and the inter-view block is located using the disparity vector derived from the depth information of current block in current picture.

View synthesis prediction (VSP) is a technique to remove interview redundancies among video signal from different viewpoints, in which synthetic signal is used as references to predict a current picture. In 3D-HEVC test model, there exists a process to derive a disparity vector predictor. The derived disparity vector is then used to fetch a depth block in the depth image of the reference view. The fetched depth block would have the same size of the current prediction unit (PU), and it will then be used to do backward warping for the current PU. In addition, the warping operation may be performed at a sub-PU level precision, like 8×4 or 4×8 blocks. A maximum depth value is picked for a sub-PU block and used for warping all the pixels in the sub-PU block. The VSP technique is applied for texture picture coding. In current implementation, VSP is added as a new merging candidate to signal the use of VSP prediction. In such a way, a VSP block may be a skipped block without any residual, or a merge block with residual information coded.

The example shown in FIG. 2 corresponds to a view coding order from V0 (i.e., base view), V1, and V2. The current block in the current picture being coded is in V2. According to HTM3.1, all the MVs of reference blocks in the previously coded views can be considered as an inter-view candidate even if the inter-view pictures are not in the reference picture list of current picture. In FIG. 2, frames 210, 220 and 230 correspond to a video picture or a depth map from views V0, V1 and V2 at time t1 respectively. Block 232 is the current block in the current view, and blocks 212 and 222 are the current blocks in V0 and V1 respectively. For current block 212 in V0, a disparity vector (216) is used to locate the inter-view collocated block (214). Similarly, for current block 222 in V1, a disparity vector (226) is used to locate the inter-view collocated block (224). According to HTM3.1, the motion vectors or disparity vectors associated with inter-view collocated blocks from any coded views can be included in the inter-view candidates. Therefore, the number of inter-view candidates can be rather large, which will require more processing time and large storage space. It is desirable to develop a method to reduce the processing time and or the storage requirement without causing noticeable impact on the system performance in terms of BD-rate or other performance measurement.

In 3DV-HTM, a disparity vector can be used as a DVP candidate for Inter mode or as a Merge candidate for Merge/Skip mode. A derived disparity vector can also be used as an offset vector for inter-view motion prediction and inter-view residual prediction. When used as an offset vector, the DV is derived from spatial or temporal neighboring blocks as shown in FIG. 3. Multiple spatial and temporal neighboring blocks are determined and DV availability of the spatial and temporal neighboring blocks is checked according to a pre-determined order. This coding tool for DV derivation based on neighboring (spatial and temporal) blocks is termed as Neighboring Block DV (NBDV). As shown in FIG. 3A, the spatial neighboring block set includes the location diagonally across from the lower-left corner of the current block (i.e., A0), the location next to the left-bottom side of the current block (i.e., A1), the location diagonally across from the upper-left corner of the current block (i.e., B2), the location diagonally across from the upper-right corner of the current block (i.e., B0), and the location next to the top-right side of the current block (i.e., B1). As shown in FIG. 3B, the temporal neighboring block set includes the location at the center of the current block (i.e., $B_{CTR}$) and the location diagonally across from the lower-right corner of the current block (i.e., RB) in a temporal reference picture. Instead of the center location, other locations (e.g., a lower-right block) within the current block in the temporal reference picture may also be used. In other words, any block collocated with the current block can be included in the temporal block set. Once a block is identified as having a DV, the checking process will be terminated. An exemplary search order for the spatial neighboring blocks in FIG. 3A is (A1, B1, B0, A0, B2). An exemplary search order for the temporal neighboring blocks for the temporal neighboring blocks in FIG. 3B is (BR, $B_{CTR}$). The spatial and temporal neighboring blocks are the same as the spatial and temporal neighboring blocks of AMVP and Merge modes in HEVC.

If a DCP coded block is not found in the neighboring block set (i.e., spatial and temporal neighboring blocks as shown in FIGS. 3A and 3B), the disparity information can be obtained from another coding tool (DV-MCP). In this case, when a neighboring block is MCP coded block and its motion is predicted by the inter-view motion prediction, as shown in FIG. 4, the disparity vector used for the inter-view motion prediction represents a motion correspondence between the current and the inter-view reference picture. This type of motion vector is referred to as inter-view predicted motion vector and the blocks are referred to as DV-MCP blocks. FIG. 4 illustrates an example of a DV-MCP block, where the motion information of the DV-MCP block (410) is predicted from a corresponding block (420) in the inter-view reference picture. The location of the corresponding block (420) is specified by a disparity vector (430). The disparity vector used in the DV-MCP block represents a motion correspondence between the current and inter-view reference picture. The motion information (422) of the corresponding block (420) is used to predict motion information (412) of the current block (410) in the current view.

To indicate whether a MCP block is DV-MCP coded and to store the disparity vector for the inter-view motion parameters prediction, two variables are used to represent the motion vector information for each block:
  dvMcpFlag, and
  dvMcpDisparity.

When dvMcpFlag is equal to 1, the dvMcpDisparity is set to indicate that the disparity vector is used for the inter-view motion parameter prediction. In the construction process for the AMVP and Merge candidate list, the dvMcpFlag of the candidate is set to 1 if the candidate is generated by inter-view motion parameter prediction and is set to 0 otherwise. The disparity vectors from DV-MCP blocks are used in following order: A0, A1, B0, B1, B2, Col (i.e., Collocated block, $B_{CTR}$ or RB).

A method to enhance the NBDV by extracting a more accurate disparity vector from the depth map is utilized in current 3D-HEVC. A depth block from coded depth map in the same access unit is first retrieved and used as a virtual depth of the current block. This coding tool for DV derivation is termed as Depth-oriented NBDV (DoNBDV). While coding the texture in view 1 and view 2 with the common test condition, the depth map in view 0 is already available. So the coding of texture in view 1 and view 2 can be benefited from the depth map in view 0. An estimated disparity vector can be extracted from the virtual depth shown in FIG. 5. The overall flow is as following:

1. Use an estimated disparity vector, which is the NBDV in current 3D-HTM, to locate the corresponding block in the coded texture view 2. Use the collocated depth in the coded view for current block (coding unit) as virtual depth.

3. Extract a disparity vector for inter-view motion prediction from the maximum value in the virtual depth retrieved in the previous step.

In the example illustrated in FIG. 5, the coded depth map in view 0 is used to derive the DV for the texture frame in view 1 to be coded. A corresponding depth block (530) in the coded D0 is retrieved for the current block (CB, 510) according to the estimated disparity vector (540) and the location (520) of the current block of the coded depth map in view 0. The retrieved block (530) is then used as the virtual depth block (530') for the current block to derive the DV. The maximum value in the virtual depth block (530') is used to extract a disparity vector for inter-view motion prediction.

In current 3D-AVC (3D video coding based on Advanced Video Coding (AVC)), the disparity vector (DV) is used for disparity compensated prediction (DCP), predicting DV and indicating the inter-view corresponding block to derive inter-view candidate.

In order to share the previously encoded texture information of reference views, the concept of disparity-compensated prediction (DCP) has been added as an alternative to the motion-compensated prediction (MCP). MCP refers to an inter picture prediction that uses already coded pictures of the same view in a different access unit, while DCP refers to an inter picture prediction that uses already coded pictures of other views in the same access unit. The vector used for DCP is termed disparity vector (DV), which is analog to the motion vector (MV) used in MCP.

In Inter mode, Direction-Separate Motion Vector Prediction is another coding tool used in 3D-AVC. The direction-separate motion vector prediction consists of the temporal and inter-view motion vector prediction. If the target reference picture is a temporal prediction picture, the temporal motion vectors of the adjacent blocks around the current block Cb, such as A, B, and C in FIG. 6A are employed in the derivation of the motion vector prediction. If a temporal motion vector is unavailable, an inter-view motion vector is used. The inter-view motion vector is derived from the corresponding block indicated by a DV converted from depth. The motion vector prediction is then derived as the median of the motion vectors of the adjacent blocks A, B, and C. Block D is used only when C is unavailable.

On the contrary, if the target reference picture is an inter-view prediction picture, the inter-view motion vectors of the neighboring blocks are employed for the inter-view prediction. If an inter-view motion vector is unavailable, a disparity vector which is derived from the maximum depth value of four corner depth samples within the associated depth block is used. The motion vector predictor is then derived as the median of the inter-view motion vector of the adjacent blocks A, B, and C.

When the target reference picture is an inter-view prediction picture, the inter-view motion vectors of the neighboring blocks are used to derive the inter-view motion vector predictor. In block 610 of FIG. 6B, inter-view motion vectors of the spatially neighboring blocks are derived based on the texture data of respective blocks. The depth map associated with the current block Cb is also provided in block 660. The availability of inter-view motion vector for blocks A, B and C is checked in block 620. If an inter-view motion vector is unavailable, the disparity vector for the current block is used to replace the unavailable inter-view motion vector as shown in block 630. The disparity vector is derived from the maximum depth value of the associated depth block as shown in block 670. The median of the inter-view motion vectors of blocks A, B and C is used as the inter-view motion vector predictor. The conventional MVP procedure, where a final MVP is derived based on the median of the motion vectors of the inter-view MVPs or temporal MVPs as shown in block 640. Motion vector coding based on the motion vector predictor is performed as shown in block 650.

Priority based MVP candidate derivation for Skip/Direct mode is another coding tool for 3D-AVC. In Skip/Direct mode, a MVP candidate is derived based on a predefined derivation order: inter-view candidate and the median of three spatial candidates derived from the neighboring blocks A, B, and C (D is used only when C is unavailable) as shown in FIG. 7.

Inter-view MV candidate derivation is also shown in FIG. 7. The central point (712) of the current block (710) in the dependent view and its disparity vector are used to find a corresponding point in the base view or reference view. After that, the MV of the block including the corresponding point in the base view is used as the inter-view candidate of the current block. The disparity vector can be derived from both the neighboring blocks (A, B and C/D) and the depth value of the central point. Specifically, if only one of the neighboring blocks has disparity vector (DV), the DV is used as the disparity. Otherwise, the DV is then derived as the median of the DVs (720) of the adjacent blocks A, B, and C. If a DV is unavailable, a DV converted from depth is then used instead. The derived DV is used to locate a corresponding block (740) in the reference picture (730).

As described above, DV derivation is critical in 3D video coding for both 3D-HEVC and 3D-AVC. Considering the condition that the testing 3D sequences are rectified and no vertical shifting between views, some coding tools may only use the DV without vertical component for inter-view data access. However, when the input data is not rectified, we may still need the vertical component of the DV to indicate the correct corresponding block in the other views.

SUMMARY

A method and apparatus for three-dimensional video encoding or decoding are disclosed. In one embodiment, a derived DV (disparity vector) for the current texture block is determined and DV constraint is applied or is not applied to the derived DV to obtain a final derived DV. Inter-view predictive encoding or decoding is then applied to the input data utilizing at least one of selected coding tools, wherein a same final derived DV is used by all selected coding tools, and the selected coding tools comprise inter-view residual prediction, view synthesis prediction and inter-view motion parameter prediction. The final derived DV can be used to locate a reference residual block in an inter-view picture for the inter-view residual prediction, and wherein the final derived DV or an associated motion vector associated with a reference block located by the final derived DV is used as an inter-view motion vector predictor for the inter-view motion parameter prediction, and wherein the final derived DV is used to locate a reference depth block in an inter-view depth picture for view synthesis prediction. The coding tools may exclude DCP (disparity compensated prediction). DV constraint indication can be used to determine whether DV constraint is applied or not applied to the derived DV, and the DV constraint indication can be determined according to a coding profile.

In one embodiment, when DV constraint is applied for a first profile, the selected coding tools exclude DCP (disparity compensated prediction), and a vertical component of a derived DV used for the DCP is set to a reduced range, and wherein a vertical component of the derived DV for the selected coding tools is set to zero. The DV constraint indication can be signaled using a syntax element in VPS (video parameter set), PPS (picture parameter set), SPS (sequence parameter set), slice header, sequence level, view level, picture level, slice level, LCU (which is also termed as Coding Tree Unit; CTU) level, CU level, or PU level. The DV constraint may set vertical component or horizontal component of the final derived DV to zero or to a reduced range.

One aspect of the present invention addresses interpolation process for inter-view residual prediction. When the final derived DV points to a sub-sample location and DV constraint is applied, residual prediction signal for the inter-view residual prediction can be derived by interpolating residual samples of a reference view using a 1D filter (one-dimensional filter). However, if DV constraint is not applied, residual prediction signal for the inter-view residual prediction can be derived by interpolating residual samples of a reference view using a 2D filter (two-dimensional filter). For DoNBDV (Depth-oriented Neighboring Block Disparity Vector) and when the final derived DV points to a sub-sample location and DV constraint is applied, depth signal for the DoNBDV can be derived by interpolating residual samples of a reference view using a 1D filter (one-dimensional filter). However, when DV constraint is not applied, depth signal for the DoNBDV can be derived by interpolating residual samples of a reference view using a 2D filter (two-dimensional filter). The 2D filter can be a 2D rounding filter that uses a first value of first integer depth samples pointed by a rounded DV derived by rounding the final derived DV to an integer value. When the DV constraint indicator indicates that DV constraint is enabled, the vertical component of the derived DV derived by DoNBDV is set to zero.

DETAILED DESCRIPTION

Figure 1:
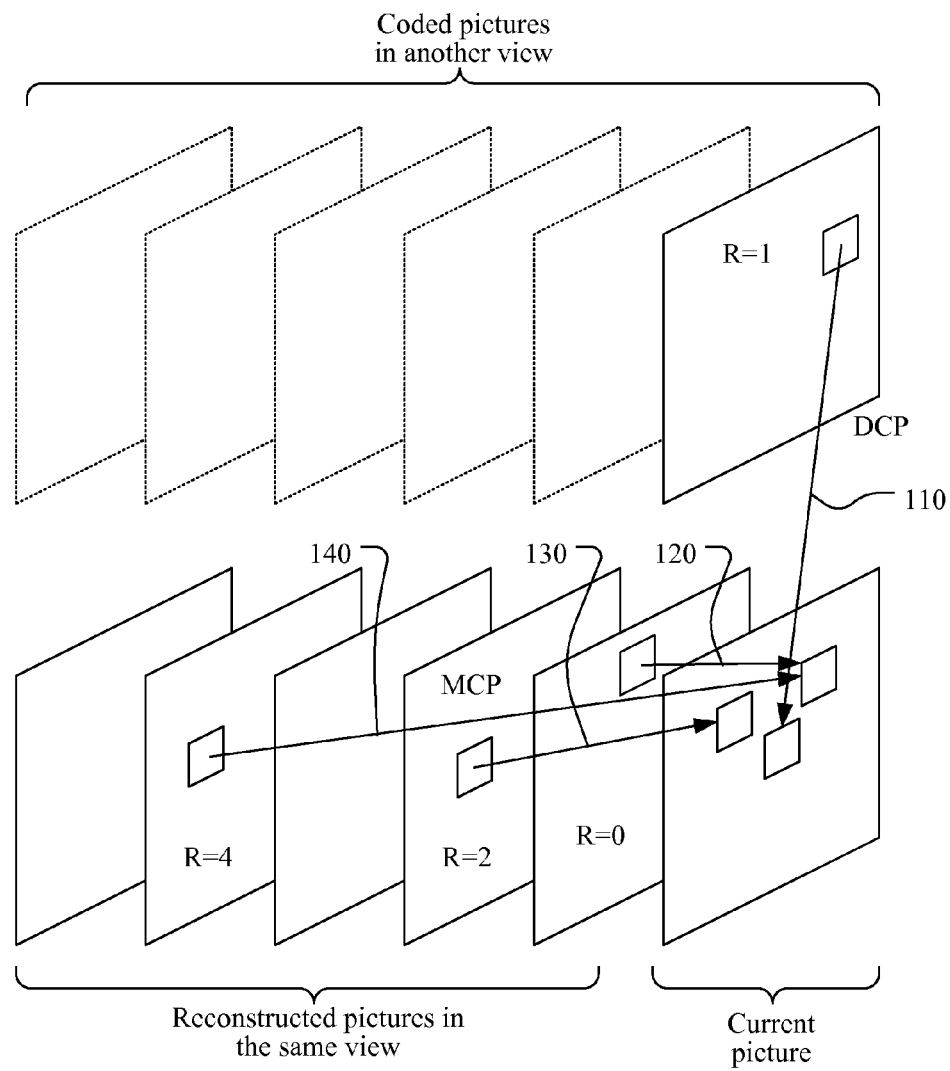
FIG. 1 illustrates an example of three-dimensional coding incorporating disparity-compensated prediction (DCP) as an alternative to motion-compensated prediction (MCP).
Figure 2:
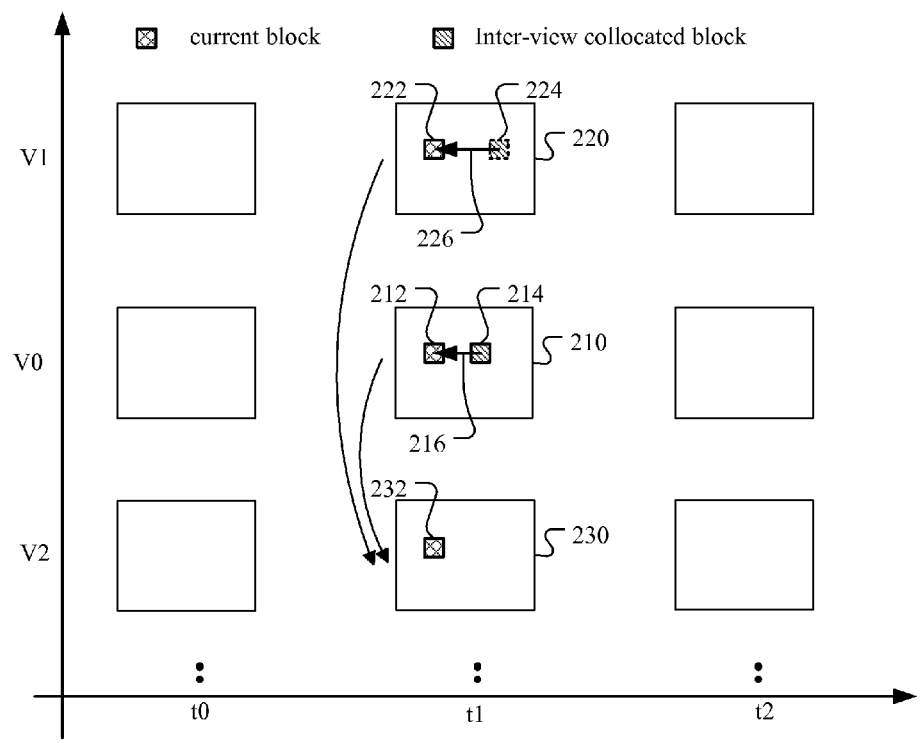
FIG. 2 illustrates an example of three-dimensional coding that utilizes previously coded information or residual information of adjacent views.
Figure 3A:
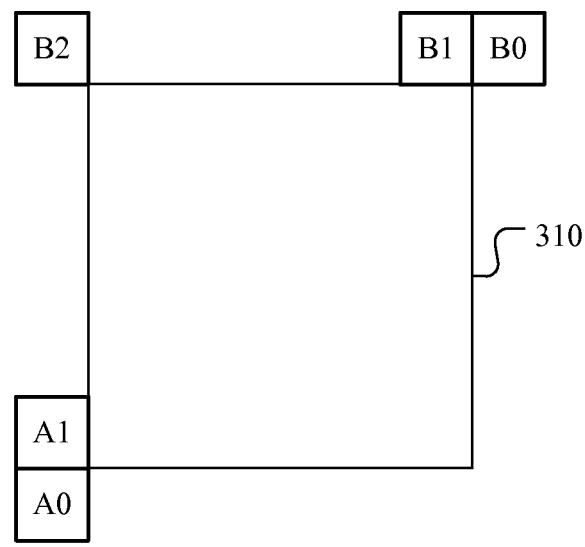
FIGS. 3A-3B illustrate respective spatial neighboring blocks and temporal neighboring blocks of the current block for deriving a disparity vector for the current block.
Figure 3B:
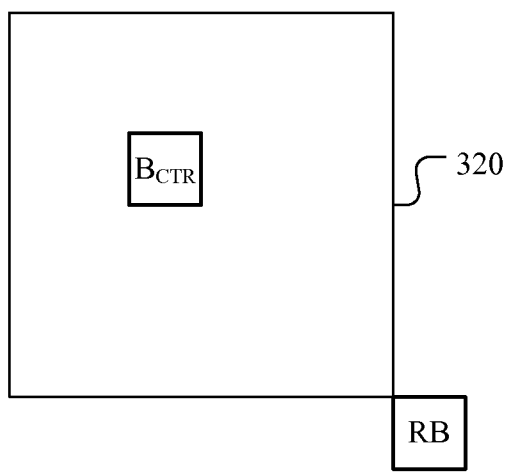
Figure 4:
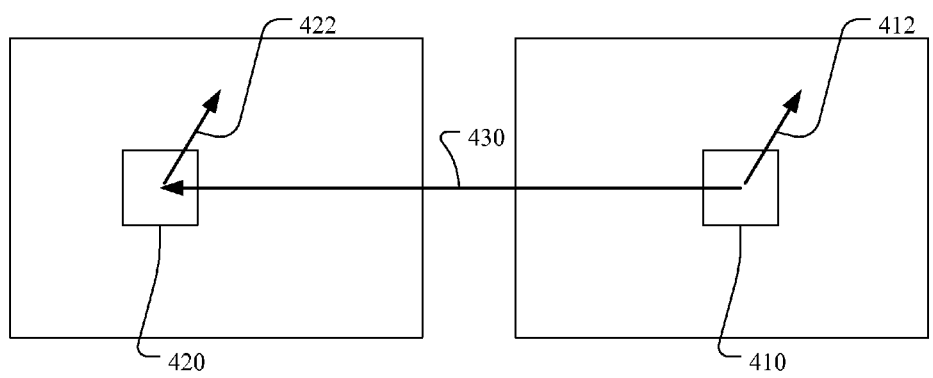
FIG. 4 illustrates an example of a disparity-vector based motion-compensated prediction (DV-MCP) block, where the location of the corresponding blocks is specified by a disparity vector.
Figure 5:
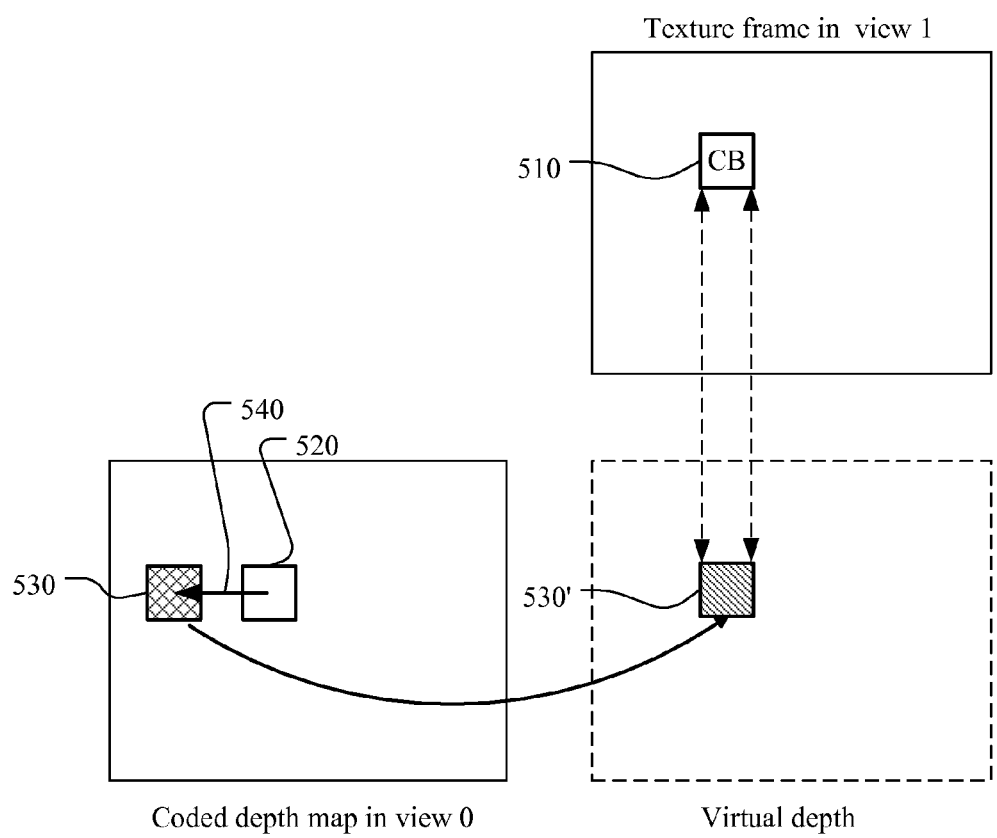
FIG. 5 illustrates an example of derivation of an estimated disparity vector based on the virtual depth of the block.
Figure 6A:
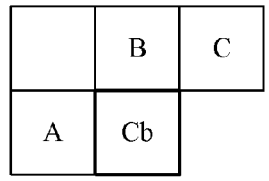
FIG. 6A-6B illustrates an example of direction-separated motion vector prediction for Inter mode.
Figure 6B:
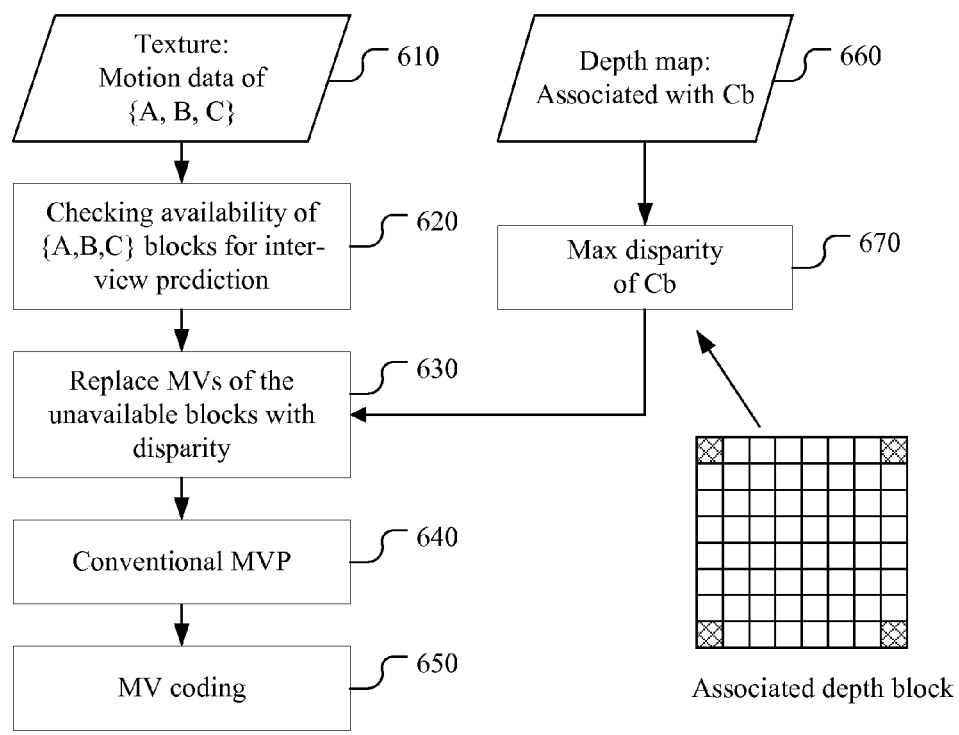
Figure 7:
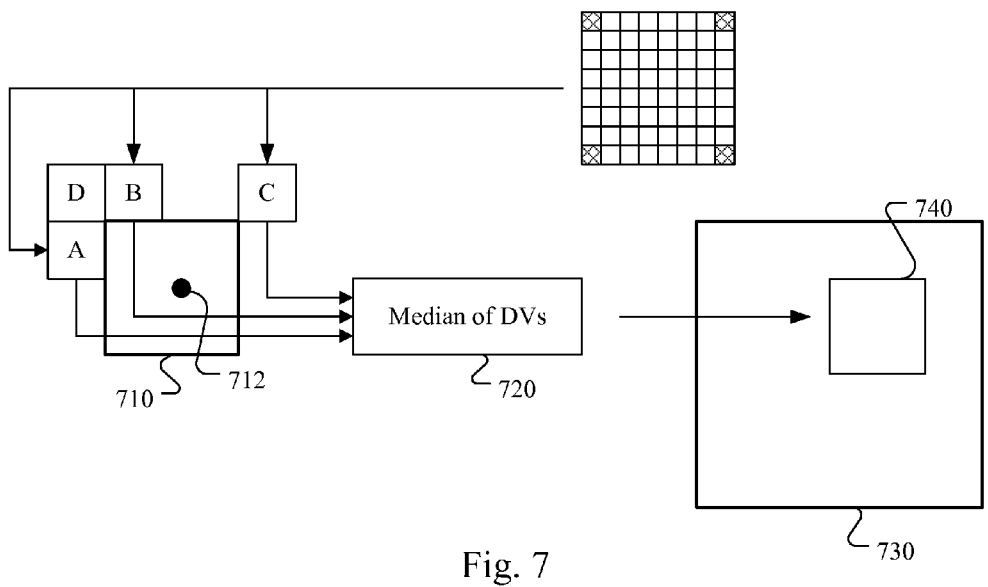
FIG. 7 illustrates an example of priority based MVP candidate derivation for Skip/Direct mode.

As described above, DV is critical in 3D video coding for both 3D-HEVC and 3D-AVC. In embodiments of the present invention, methods are disclosed to apply or remove constraints on the disparity vectors (DVs) conditionally. Furthermore, the methods can be selectively applied to the DVs in the 3D and multi-view video coding system.

In existing 3D-HEVC and 3D-AVC, the constraint is applied to force the vertical DV component to be zero in some coding tools. However, in other coding tools, the constraint is not applied to the vertical DV component. In one embodiment of the present invention, the constraint is applied or removed on the DVs in a unified fashion for all coding tools except for the DVs used for disparity compensated prediction (DCP). In other words, the vertical components of all the DVs excluding those used for DCP can be forced to zero (or within a smaller range than the original DVs) or can be allowed to have non-zero values. The constraint may also be applied to the horizontal component of the DVs. Furthermore, the constraint may be only applied to the DVs used for selected coding tools. The DVs used for other coding tools may not subject to any constraint. Alternatively, different constraint may be applied to the DVs used for other coding tools.

In existing 3D-HEVC and 3D-AVC, only horizontal components of the DV derived from DV-MCP blocks are stored and the vertical components are discarded. When the constraint is removed on the DVs, the vertical components of DVs derived from DV-MCP blocks can be non-zero. In this case, the vertical components of the DVs derived may have to be stored. The conditional constraint on the DVs can be applied to the DVs derived from DV-MCP blocks. Similarly, the conditional constraint on the DVs can be applied to other 3D video coding tools.

The conditional constraint mentioned above forces the vertical (or horizontal) component of the DV to be zero or a smaller value within a predefined range from M to N. In practical implementation, only the horizontal (or vertical) component of the DV is used instead of setting the vertical (horizontal) component of the DV to zero. Therefore, some memory buffer can be saved. Moreover, one additional syntax element can be signaled in PPS (picture parameter set), SPS (sequence parameter set), slice header, sequence level, view level, picture level, slice level, LCU level, CU level, PU level, or other level to indicate which component (vertical or horizontal) is subject to the constraint.

The conditional constraint on the DV can be based on conditions including:
1. When the cameras are arranged horizontally.
2. When the input multi-view video is rectified.
3. When no vertical disparities exist between views.
4. When the optical axes of camera are in parallel horizontally and the views are rectified such that no vertical disparities exist.
5. When the cameras are arranged vertically.
6. When no horizontal disparities exist between views.
7. When the optical axes of camera are in parallel vertically and the views are rectified such that no horizontal disparities exist.

Additional syntax can be signaled in VPS (video parameter set), PPS, SPS, slice header, sequence level, view level, picture level, slice level, LCU level, CU level, PU level, or other level to indicate if the constraint is applied to the DV. Profile dependent scheme is used in another embodiment to indicate if the constraint is applied to the derived DV. In coding system, coding profiles are often defined to configure a coding system for different applications. For example, a Main profile may be used for common applications.

The above exemplary conditions can be used individually or can be combined. For example, a syntax element can be signaled to indicate whether the vertical components of the DVs used for DCP are within a smaller range and the vertical components of all the DVs excluding the ones used for DCP are forced to be zero. In another example, syntax is signaled to indicate whether the vertical components of all the DVs excluding the ones used for DCP are forced to be zero. In this case, the vertical components of the DVs used for DCP can be limited to a reduced range or not depending on the default setting without sending additional syntax. In yet another example, syntax is signaled to indicate whether the vertical components of the DVs used for DCP are within a reduced range. The vertical components of all the DVs excluding those used for DCP can be zero or non-zero depending on the default setting without sending additional syntax. In yet another example, additional syntax is signaled to indicate whether the vertical components of the DVs used for DCP are within a reduced range. Furthermore, additional syntax is signaled to indicate whether the vertical components of all the DVs excluding the ones used for DCP are forced to be zero. In yet another example, for a specific profile selected, the vertical components of the DVs used for DCP are within a reduced range and the vertical components of all DVs excluding the ones used for DCP are forced to be zero.

In other embodiments of the present invention, the conditional constraint is applied to adaptive coding in the 3D and multi-view video coding system. The DV constraint corresponds to limiting the x-component (i.e., horizontal component), y-component (i.e., vertical component), or both components of the derived DV in a specified range.

One aspect of the present invention addresses DV derivation for conditional constraint on DVs for inter-view residual prediction when the disparity vector points to a sub-sample location. In this case, the residual prediction signal is obtained by interpolating the residual samples of the reference view using a 1D (one-dimensional) filter. The 1D filter can be selected from the list used for the case:

1. a 1D (one-dimensional) linear filter,
2. a 1D average filter that averages two nearest integer residual samples,
3. a 1D minimum filter that selects the minimum value of the two nearest integer residual samples,
4. a 1D maximum filter that selects the maximum value of the two nearest integer residual samples,
5. a 1D rounding filter that uses the value of the integer residual samples pointed by the rounded DV, and
6. a 1D truncating filter that uses the value of the integer residual samples pointed by the truncated DV.

If the DV constraint for inter-view residual prediction is disabled, the residual prediction signal is obtained by interpolating the residual samples of the reference view using a 2D (two-dimensional) filter if the disparity vector points to a sub-sample location. The 2D filter can be selected from the following list:

1. a 2D bi-linear filter,
2. a 2D average filter that averages four nearest integer residual samples,
3. a 2D minimum filter that selects the minimum value of the four nearest integer residual samples,
4. a 2D maximum filter that selects the maximum value of the four nearest integer residual samples,
5. a 2D median filter that uses a median value of the four nearest integer residual samples,
6. a 2D rounding filter that uses the value of the integer residual samples pointed by the rounded DV, and
7. a 2D truncating filter that used the value of the integer residual samples pointed by the truncated DV.

The above list shows some known 1D filters used for image processing. Nevertheless, the list is not meant for an exhaustive list. Another aspect of the present invention addresses DV derivation for conditional constraint on Depth-oriented Neighboring Block Disparity Vector (DoNBDV) when the disparity vector points to a sub-sample location. In this case, the depth signal in the reference view is obtained by interpolating the depth samples of the reference view using a 1D (one-dimensional) filter. The 1D filter can be selected from the same 1D filter list as used for the inter-view residual prediction with the conditional constraints on DVs enabled.

If the DV constraint for DoNBDV is disabled, the depth signal in the reference view is obtained by interpolating the depth samples of the reference view using a 2D (two-dimensional) filter if the disparity vector points to a sub-sample location. The 2D filter can be selected from the same 2D filter list as used for the inter-view residual prediction with the conditional constraints on DVs disabled. In one embodiment, the 2D filter used for interpolation is a 2D rounding filter that uses a first value of first integer depth samples pointed by a rounded DV derived by rounding the final derived DV to an integer value.

The performance for a system incorporating an embodiment of the present invention is compared with a conventional system. Test sequences designated as common test condition (CTC) sequences and multi-view coding (MVC) test sequences are used to compare the system performance. The CTC sequences (CTC_Noshift) are all rectified and contain no vertical DV component. However, in real applications, input multi-view videos may not be always rectified. Therefore, CTC sequences with vertical DV components (CTC_Shift16, CTC_Shift32 and CTC_Shift64) are also used for testing. Similarly, the MVC sequences include test sequences with vertical DV component (MVC Shift) as well as test sequences without vertical DV components (MVC_NoShift). Table 1 summarizes the DV constraints in the existing HTM and a system incorporating embodiments of present invention. In other words, system 1 corresponds to HTM-5.1 system, system 2 corresponds to an embodiment of the present invention with DV constraint enabled for both inter-view residual prediction and inter-view motion parameter prediction, and system 3 corresponds to an embodiment of the present invention with DV constraint disabled for both inter-view residual prediction and inter-view motion parameter prediction.

TABLE 1

| | | Inter-view residual prediction | Inter-view motion parameter prediction |
|---|---|---|---|
| 1 | HTM-5.1 | On | Off |
| 2 | Enable DV constraint | On | On |
| 3 | Disable DV constraint | Off | Off |

The HTM-5.1 is used as an anchor system for the comparison. The coding performance of systems incorporating embodiments of the present invention with respect to the anchor system is shown in Table 2. The performance comparison is performed using both CTC and MVC test sequences with and without vertical DV components. The BD-rate differences are shown for texture pictures in view 1 (video 1), view 2 (video 2) and overall bitrate to achieve a given peak Signal-to-Noise ratio (video PSNR/total bitrate). A negative value in the BD-rate implies the present invention has a higher performance (i.e., lower bit rate). As shown in Table 2, the BD-rates for the current invention with DV constraint enabled or disable are comparable (a slightly better performance up to 0.3% reduction in total bitrate) to the BD-rate performance as HTM-5.1 when there is no vertical DV component in the source test sequences. However, disabling the DV constraint for the sequences with vertical shift between views can achieve 0.7% and 0.3% total BD-rate reductions for MVC sequences with shift and CTC sequences with shift respectively. On the other hand, enabling DV constraint may cause noticeable performance degradation (up to 3% loss in total bitrate) when the source test sequences contain vertical shift between views as shown in Table 2.

The flowcharts shown above are intended to illustrate examples of inter-view prediction using the conditionally constrained disparity vector. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the

TABLE 2

| | | Enable DV Constraint | | | Disable DV Constraint | | |
|---|---|---|---|---|---|---|---|
| | Testing Sequences | video 1 | video 2 | video PSNR/total bitrate | video 1 | video 2 | video PSNR/total bitrate |
| Without vertical shifts between views | CTC_NoShift | 0.0% | 0.0% | 0.0% | 0.2% | 0.3% | 0.1% |
| | MVC_NoShift | 0.2% | 0.1% | 0.1% | 0.1% | 0.1% | 0.0% |
| With vertical shifts between views | MVC_Shift | 6.1% | 6.0% | 2.9% | −1.6% | −1.6% | −0.7% |
| | CTC_Shift16 | 1.6% | 4.6% | 1.0% | −0.8% | −1.0% | −0.3% |
| | CTC_Shift32 | 3.8% | 8.2% | 1.9% | −0.9% | −1.2% | −0.3% |
| | CTC_Shift64 | 7.7% | 11.9% | 3.0% | −0.9% | −1.3% | −0.3% |

Figure 8:
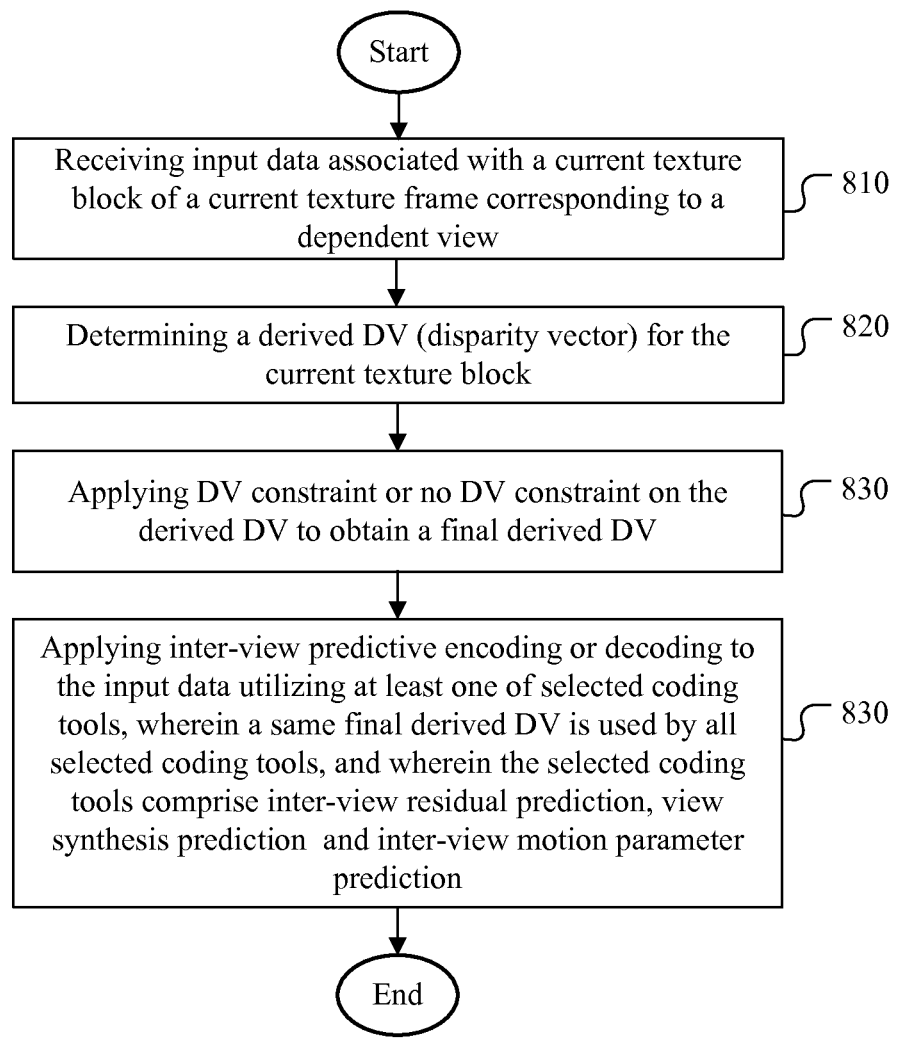
FIG. 8 illustrates an exemplary flowchart of an inter-view predictive coding system incorporating conditionally constrained disparity vector according to an embodiment of the present invention.

FIG. 8 illustrates an exemplary flowchart of a three-dimensional encoding or decoding system incorporating a conditionally constrained disparity vector according to an embodiment of the present invention. The system receives input data associated with a current texture block of a current texture frame corresponding to a dependent view as shown in step 810. For encoding, the input data associated with the current texture block corresponds to original pixel data, depth data, residual data or other information associated with the current block (e.g., motion vector, disparity vector, motion vector difference, or disparity vector difference) to be coded. For decoding, the input data corresponds to coded texture block to be decoded. The input data may be retrieved from storage such as a computer memory, buffer (RAM or DRAM) or other media. The input data may also be received from a processor such as a controller, a central processing unit, a digital signal processor or electronic circuits that produce the first data. A derived DV (disparity vector) is determined for the current texture block as shown in step 820. DV constraint is applied or is not applied to the derived DV to obtain a final derived DV as shown in step 830. Inter-view predictive encoding or decoding is applied to the input data utilizing at least one of selected coding tools as shown in step 840, wherein a same final derived DV is used by all selected coding tools, and wherein the selected coding tools comprise inter-view residual prediction, view synthesis prediction, and inter-view motion parameter prediction.

present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for three-dimensional or multi-view video encoding or decoding, the method comprising:
receiving input data associated with a current texture block of a current texture frame corresponding to a dependent view;
determining a derived disparity vector (DV) for the current texture block;
determining whether a DV constraint is enabled or disabled for a plurality of selected coding tools including inter-view residual prediction, view synthesis prediction, and inter-view motion parameter prediction,
wherein when the DV constraint is enabled, then the DV constraint is enabled for each one of the plurality of selected coding tools in a unified fashion,
wherein when the DV constraint is disabled, then the DV constraint is disabled for each one of the plurality of selected coding tools in a unified fashion;
applying the DV constraint on the derived DV to obtain a final derived DV when the DV constraint is enabled; and
applying inter-view predictive encoding or decoding to the input data utilizing at least one of the plurality of selected coding tools, wherein the final derived DV is used by each one of the plurality of selected coding tools.

2. The method of claim 1, wherein the final derived DV is used to locate a reference residual block in an inter-view picture for the inter-view residual prediction, and wherein the final derived DV or an associated motion vector associated with a reference block located by the final derived DV is used as an inter-view motion vector predictor for the inter-view motion parameter prediction, and wherein the final derived DV is used to locate a reference depth block in an inter-view depth picture for view synthesis prediction.

3. The method of claim 1, wherein the coding tools exclude disparity compensated prediction (DCP).

4. The method of claim 1, wherein applying DV constraint or no DV constraint on the derived DV is decided according to DV constraint indication.

5. The method of claim 4, wherein the DV constraint indication is determined according to a coding profile.

6. The method of claim 5, wherein when the DV constraint indication indicates that the DV constraint is enabled for a first profile, the selected coding tools exclude disparity compensated prediction (DCP) and a vertical component of one derived DV used for DCP is set to a reduced range, and wherein one vertical component of one derived DV used for the selected coding tools is set to zero.

7. The method of claim 4, wherein the DV constraint indication is signaled using a syntax element in video parameter set (VPS), picture parameter set (PPS), sequence parameter set (SPS), slice header, sequence level, view level, picture level, slice level, LCU level, CTU level, CU level, or PU level.

8. The method of claim 1, wherein a syntax element is signaled in video parameter set (VPS), picture parameter set (PPS), sequence parameter set (SPS), slice header, sequence level, view level, picture level, slice level, LCU level, CTU level, CU level, or PU level to indicate which component of the derived DV that the DV constraint is applied to.

9. The method of claim 1, wherein said applying DV constraint sets vertical component or horizontal component of the final derived DV to zero or to a reduced range.

10. The method of claim 1, wherein when the final derived DV points to a sub-sample location and DV constraint is applied, residual prediction signal for the inter-view residual prediction is derived by interpolating residual samples of a reference view using a one-dimensional (1D) filter.

11. The method of claim 10, wherein the 1D filter is selected as a 1D linear filter.

12. The method of claim 1, wherein when the final derived DV points to a sub-sample location and DV constraint is not applied, residual prediction signal for the inter-view residual prediction is derived by interpolating residual samples of a reference view using a two-dimensional (2D) filter.

13. The method of claim 12, wherein the 2D filter is selected as a 2D bi-linear filter.

14. The method of claim 1, wherein the coding tools further comprises Depth-oriented Neighboring Block Disparity Vector (DoNBDV) and when the final derived DV points to a sub-sample location and DV constraint is applied, depth signal for DoNBDV is derived by interpolating depth samples of a reference view using a one-dimensional (1D) filter.

15. The method of claim 14, wherein the 1D filter is a 1D rounding filter that uses a first value of first integer depth samples pointed by a rounded DV derived by rounding the final derived DV to an integer value.

16. The method of claim 14, wherein when DV constraint is applied, a vertical component of the DV derived by DoNBDV is set to zero.

17. The method of claim 1, wherein the coding tools further comprises Depth-oriented Neighboring Block Disparity Vector (DoNBDV) and when the final derived DV points to a sub-sample location and DV constraint indicator is not applied, depth signal for the DoNBDV is derived by interpolating depth samples of a reference view using a two-dimensional (2D) filter.

18. The method of claim 17, wherein the 2D filter is a 2D rounding filter that uses a first value of first integer depth samples pointed by a rounded DV derived by rounding the final derived DV to an integer value.

19. An apparatus for three-dimensional or multi-view video encoding or decoding, the apparatus comprising one or more electronic circuits, wherein said one or more electronic circuits are configured to:
receive input data associated with a current texture block of a current texture frame corresponding to a dependent view;
determine a derived disparity vector (DV) for the current texture block;
determining whether a DV constraint is enabled or disabled for a plurality of selected coding tools including inter-view residual prediction, view synthesis prediction, and inter-view motion parameter prediction,
wherein when the DV constraint is enabled, then the DV constraint is enabled for each one of the plurality of selected coding tools in a unified fashion,
wherein when the DV constraint is disabled, then the DV constraint is disabled for each one of the plurality of selected coding tools in a unified fashion;
apply the DV constraint on the derived DV to obtain a final derived DV when the DV constraint is enabled; and
apply inter-view predictive encoding or decoding to the input data utilizing at least one of the plurality of selected coding tools, wherein the final derived DV is used by each one of the plurality selected coding tools.

20. A method for three-dimensional or multi-view video encoding or decoding, the method comprising:

receiving input data associated with a current texture block of a current texture frame corresponding to a dependent view;

determining a derived disparity vector (DV) for the current texture block;

determining whether a DV constraint is enabled or disabled for a plurality of selected coding tools including inter-view residual prediction, view synthesis prediction, and inter-view motion parameter prediction, wherein when the DV constraint is enabled, then the DV constraint is enabled for each one of the plurality of selected coding tools in a unified fashion, wherein when the DV constraint is disabled, then the DV constraint is disabled for each one of the plurality of selected coding tools in a unified fashion;

applying the DV constraint on the derived DV to obtain a final derived DV when the DV constraint is enabled; and applying inter-view predictive encoding or decoding to the input data utilizing at least one of the plurality of selected coding tools, wherein applying the DV constraint is based on the selected coding tool, wherein the DV constraint is applied if the selected coding tool is disparity compensated prediction (DCP), and the DV constraint is not applied if the selected coding tool is one of inter-view residual prediction, view synthesis prediction, and inter-view motion parameter prediction.

21. The method of claim 20, wherein DV constraint is applied to a vertical component of the derived DV used for DCP and the vertical component is set to a reduced range.

* * * * *